US012777248B2

(12) United States Patent
Tsuji et al.

(10) Patent No.: US 12,777,248 B2
(45) Date of Patent: Oct. 27, 2026

(54) IMAGE PROCESSING APPARATUS, IMAGE PROCESSING METHOD, AND NON-TRANSITORY COMPUTER-READABLE STORAGE MEDIUM WITH CORRECTION OF CAPTURED IMAGE BASED ON INFORMATION ABOUT DISTANCE TO OBJECT OR INFORMATION ABOUT FOCAL LENGTH

(71) Applicant: CANON KABUSHIKI KAISHA, Tokyo (JP)

(72) Inventors: Tatsuya Tsuji, Kanagawa (JP); Taisuke Nishio, Kanagawa (JP); Natsuko Sato, Kanagawa (JP); Masashi Yamamoto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 19/052,702

(22) Filed: Feb. 13, 2025

(65) Prior Publication Data

US 2025/0274656 A1 Aug. 28, 2025

(30) Foreign Application Priority Data

Feb. 26, 2024 (JP) ................................ 2024-026910

(51) Int. Cl.

| | |
|---|---|
| ***H04N 23/67*** | (2023.01) |
| ***G06T 7/50*** | (2017.01) |
| ***G06T 7/80*** | (2017.01) |

(52) U.S. Cl.
CPC ............... *H04N 23/67* (2023.01); *G06T 7/50* (2017.01); *G06T 7/80* (2017.01); *G06T 2207/30244* (2013.01)

(58) Field of Classification Search
None
See application file for complete search history.

(56) References Cited

U.S. PATENT DOCUMENTS

| | | | |
|---|---|---|---|
| 9,569,825 | B2 | 2/2017 | Yamada |
| 2012/0050580 | A1 | 3/2012 | Iwasaki |
| 2015/0332443 | A1 | 11/2015 | Yamada |
| 2021/0076006 | A1 | 3/2021 | O'Neill |

FOREIGN PATENT DOCUMENTS

| | | | | |
|---|---|---|---|---|
| CN | 116528048 A * | 8/2023 | | ......... H04N 23/6812 |
| CN | 117649336 A | 3/2024 | | |
| WO | 2015/132826 A1 | 9/2015 | | |

OTHER PUBLICATIONS

May 16, 2025 European Official Action in European Patent Appln. No. 25159059.2.

* cited by examiner

*Primary Examiner* — James M Anderson, II
(74) *Attorney, Agent, or Firm* — Venable LLP

(57) ABSTRACT

An image processing apparatus includes one or more memories storing instructions and one or more processors that execute the instructions to acquire information about a focal length as distance information, and to correct a fluctuation in a captured image based on the distance information.

12 Claims, 10 Drawing Sheets

IMAGE PROCESSING APPARATUS, IMAGE PROCESSING METHOD, AND NON-TRANSITORY COMPUTER-READABLE STORAGE MEDIUM WITH CORRECTION OF CAPTURED IMAGE BASED ON INFORMATION ABOUT DISTANCE TO OBJECT OR INFORMATION ABOUT FOCAL LENGTH

BACKGROUND OF THE INVENTION

Field of the Invention

The present invention relates to a fluctuation correction technique.

Description of the Related Art

In a use case of a monitor camera for monitoring a harbor or monitoring an infrastructure, for example, when telephotographing a ship or aircraft, a fluctuation of an object image caused by an uneven change (for example, heat haze) in the refractive index of atmosphere is known to lower the visibility of the object.

Conventionally, a change of a pixel value, which occurs when an object image including a fluctuation is captured, is approximated to a normal distribution based on a predetermined position as a reference. Hence, as a method of reducing the fluctuation, there is known a method of smoothing an image in a time direction. However, in the method of smoothing the image in the time direction, if the smoothing time is long, a phenomenon that a moving object blurs (to be referred to as a moving body blur hereinafter) occurs.

In addition, since the fluctuation changes depending on the environment or time, if smoothing in the time direction is used to reduce the fluctuation, the strength of smoothing in the time direction needs to be changed in accordance with the degree of fluctuation.

Meanwhile, for example, International Publication No. 2015/132826 discloses a technique of detecting the degree of fluctuation using an input image, and averaging a frame image in the time direction in accordance with the detected degree of fluctuation, thereby correcting the fluctuation. According to the technique disclosed in International Publication No. 2015/132826, even if the degree of fluctuation changes, the fluctuation can appropriately be corrected.

However, in the technique disclosed in International Publication No. 2015/132826, since the degree of fluctuation is detected based on the difference of pixel values of the input image, the degree of fluctuation may erroneously be detected depending on the input image. For example, in the technique disclosed in International Publication No. 2015/132826, if the fluctuation of a moving object or device is included in the input image, the difference of pixel values, which is not derived from the fluctuation, may erroneously be detected as a fluctuation.

SUMMARY OF THE INVENTION

The present invention provides a technique for correcting a fluctuation with a desired correction strength.

According to the first aspect of the present disclosure, there is provided an image processing apparatus comprising one or more memories storing instructions and one or more processors that execute the instructions to: acquire information about a focal length as distance information; and correct a fluctuation in a captured image based on the distance information.

According to the second aspect of the present disclosure, there is provided an image processing apparatus comprising one or more memories storing instructions and one or more processors that execute the instructions to: acquire information about a distance to an object as distance information; and correct a fluctuation in a captured image based on the distance information.

According to the third aspect of the present disclosure, there is provided an image processing method performed by an image processing apparatus, comprising: acquiring information about a focal length as distance information; and correcting a fluctuation in a captured image based on the distance information.

According to the fourth aspect of the present disclosure, there is provided an image processing method performed by an image processing apparatus, comprising: acquiring information about a distance to an object as distance information; and correcting a fluctuation in a captured image based on the distance information.

According to the fifth aspect of the present disclosure, there is provided a non-transitory computer-readable storage medium storing a computer program configured to cause a computer to function as: an acquisition unit configured to acquire information about a focal length as distance information; and a correction unit configured to correct a fluctuation in a captured image based on the distance information.

According to the sixth aspect of the present disclosure, there is provided a non-transitory computer-readable storage medium storing a computer program configured to cause a computer to function as: an acquisition unit configured to acquire information about a distance to an object as distance information; and a correction unit configured to correct a fluctuation in a captured image based on the distance information.

Further features of the present invention will become apparent from the following description of exemplary embodiments with reference to the attached drawings.

DESCRIPTION OF THE EMBODIMENTS

Figure 1:
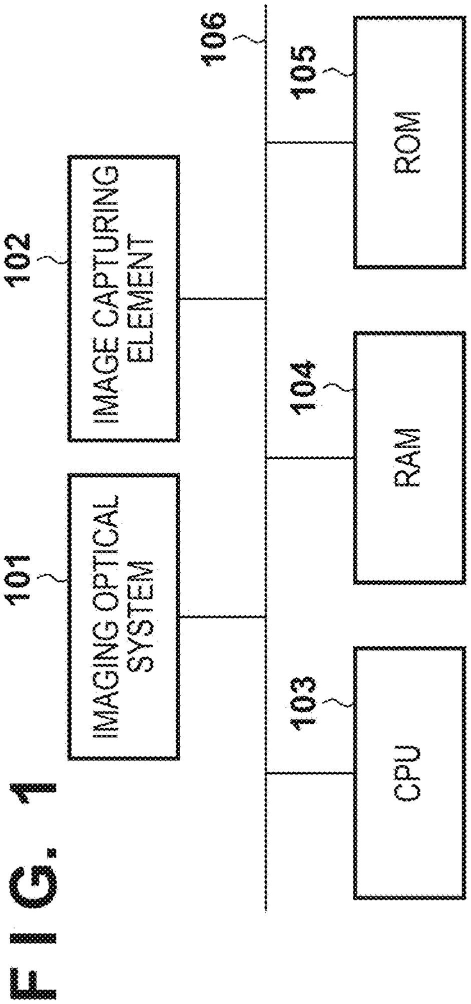
FIG. 1 is a block diagram showing an example of the hardware configuration of an image processing apparatus.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

An example of the hardware configuration of an image processing apparatus according to this embodiment will be described first with reference to the block diagram of FIG. 1. Note that FIG. 1 shows main components associated with the following description but not all the components included in the image processing apparatus. The hardware configuration shown in FIG. 1 is merely an example of the hardware configuration applicable to the image processing apparatus according to this embodiment and can appropriately be modified/changed.

An imaging optical system 101 includes one or more lenses, and a lens driving unit having a configuration for moving the lenses in the optical axis direction. As the lenses included in the imaging optical system 101, lenses such as a zoom lens capable of adjusting a focal length by moving in the optical axis direction, a focus lens capable of adjusting focus by moving in the optical axis direction, and a teleconverter (extender) capable of changing optical characteristics can be applied. The lens driving unit moves the lenses in the optical axis direction based on a control signal from a CPU 103.

Note that in this embodiment, a configuration in which the image processing apparatus and the imaging optical system 101 are integrated will be described as an example, but the present invention is not limited to this. For example, the imaging optical system 101 may be an imaging optical system such as an exchangeable lens provided outside the image processing apparatus. That is, the imaging optical system 101 need only be connected to the image processing apparatus and be able to communicate with it.

Light that has entered via the lenses in the imaging optical system 101 enters an image capturing element 102 via color filters corresponding to R (red), G (green), and B (blue). The image capturing element 102 is a photoelectric conversion element that photoelectrically converts the light that has entered via the color filters and outputs a color image (RAW image) of RGB.

The color filters are filters capable of transmitting not only visible light components corresponding to RGB but also some infrared light components included in a nonvisible light region. A complementary metal oxide semiconductor (CMOS), a charge-coupled device (CCD), a single photon avalanche diode (SPAD), or the like can be applied to the image capturing element 102.

Also, in this embodiment, a configuration in which the image processing apparatus and the image capturing element 102 are integrated will be described as an example, but the present invention is not limited to this. For example, the image capturing element 102 may be an image capturing element provided outside the image processing apparatus.

The CPU 103 executes various kinds of processing using a computer program and data stored in a RAM 104. The CPU 103 controls the operation of the entire image processing apparatus and also executes or controls various kinds of processing to be described as processing to be performed by the image processing apparatus.

The RAM 104 includes an area to store a computer program and data loaded from a ROM 105, and an area to store various kinds of information output from the imaging optical system 101 or the image capturing element 102. The RAM 104 further includes a work area that is used when the CPU 103 executes various kinds of processing. The RAM 104 can thus appropriately provide various kinds of areas.

The ROM 105 stores setting data of the image processing apparatus, a computer program and data associated with activation of the image processing apparatus, a computer program and data associated with the basic operation of the image processing apparatus, and the like. The ROM 105 also stores a computer program and data used to cause the CPU 103 to execute or control various kinds of processing to be described as processing to be performed by the image processing apparatus.

All the imaging optical system 101, the image capturing element 102, the CPU 103, the RAM 104, and the ROM 105 are connected to a bus 106. Note that the image processing apparatus may include a processor or an image processing circuit such as a GPU, and in this case, the processor or the image processing circuit may execute some or all of various kinds of processing to be described as processing to be performed by the CPU 103.

Figure 2:
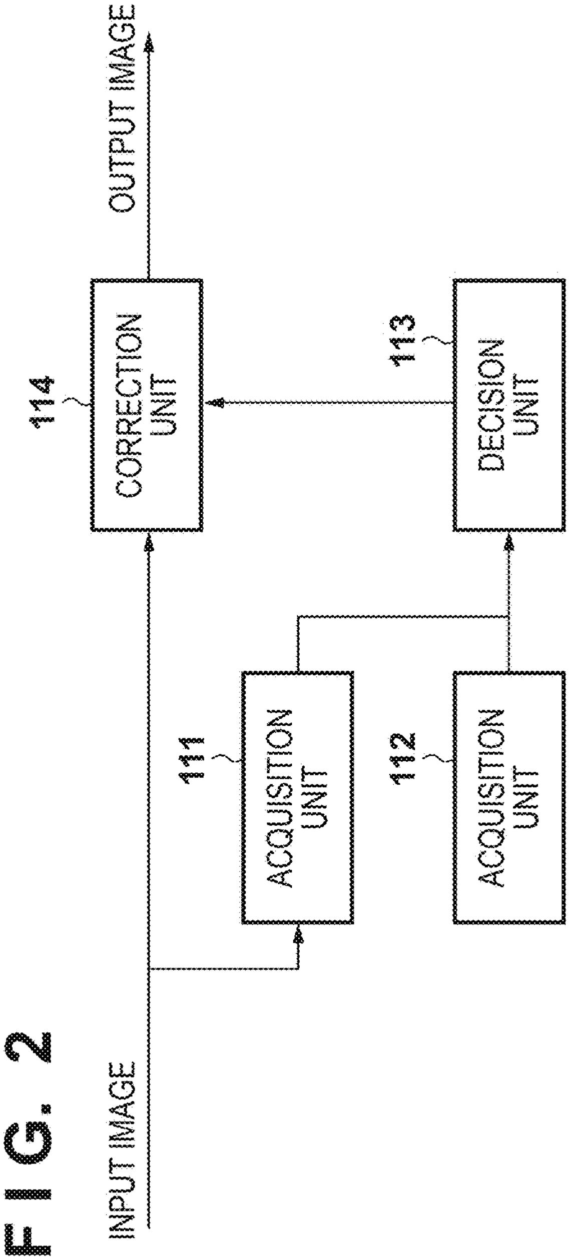
FIG. 2 is a block diagram showing an example of a functional configuration associated with processing of correcting a fluctuation in a captured image.

Next, an example of a functional configuration associated with processing of correcting a fluctuation in a captured image in the image processing apparatus according to this embodiment will be described with reference to the block diagram of FIG. 2. In this embodiment, a case where each function unit shown in FIG. 2 is implemented by software (computer program) will be explained. A function unit shown in FIG. 2 will sometimes be explained below as the main constituent of processing, but in fact, the function of the function unit is implemented by the CPU 103 executing a computer program corresponding to the function unit. Note that one or more function units shown in FIG. 2 may be implemented by hardware.

The image capturing element 102 outputs the RAW image of each frame. If the image capturing element 102 captures a moving image, the RAW image of each frame corresponds to the image of each frame in the moving image. If the image capturing element 102 periodically or non-periodically captures a still image, the RAW image of each frame corresponds to the still image.

Upon acquiring the RAW image output from the image capturing element 102, the CPU 103 performs development processing or various kinds of image processing for the RAW image, thereby generating a captured image that is an RGB color image.

An acquisition unit 111 acquires the captured image generated by the CPU 103 as an input image. The acquisition unit 111 then acquires, as fluctuation information, a fluctuation amount corresponding to each pixel position of the acquired input image.

Figure 3A:
FIG. 3A is a view for explaining an influence that a fluctuation gives to an input image.
Figure 3B:
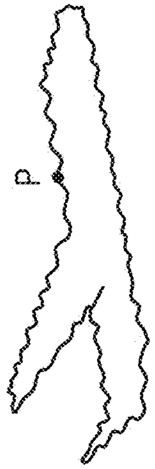
FIG. 3B is a view for explaining an influence that a fluctuation gives to an input image.

An influence that a fluctuation gives to an input image will be described here with reference to FIGS. 3A to 3C. FIG. 3A shows an example of a captured image (non-fluctuation captured image) obtained by capturing a still object in a state free from a fluctuation. FIG. 3B shows an example of a captured image (fluctuation captured image) obtained by capturing a still object in a state with a fluctuation.

As shown in FIGS. 3A and 3B, even in a case where a still object is captured, if image capturing is performed in a state with a fluctuation, a phenomenon that a distorted image is captured occurs. FIG. 3C shows the pixel value at a pixel position P of the non-fluctuation captured image of each frame (solid line) and the pixel value at the pixel position P of the fluctuation captured image of each frame (dotted line). In FIG. 3C, the abscissa represents time (frame), and the ordinate represents the pixel value.

Figure 3C:
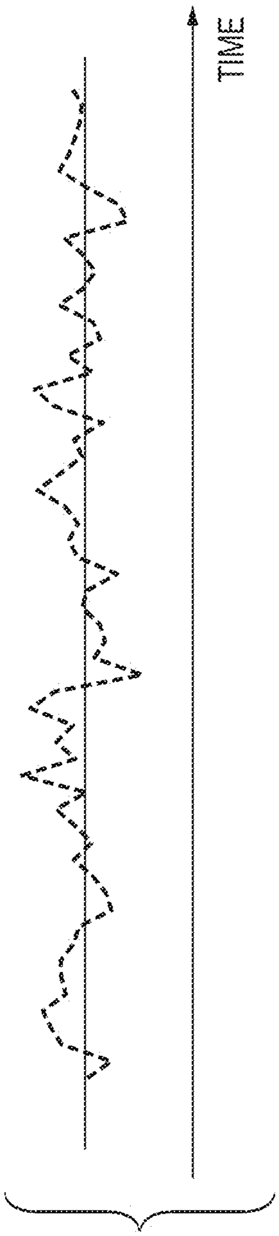
FIG. 3C is a view for explaining an influence that a fluctuation gives to an input image.

As shown in FIG. 3C, the pixel value at the pixel position P in the non-fluctuation captured image of each frame is substantially constant, and the pixel value at the pixel position P in the fluctuation captured image of each frame changes. Hence, if a fluctuation exists, a phenomenon that an object that originally stands still is captured as if it were a moving object.

Figure 4A:
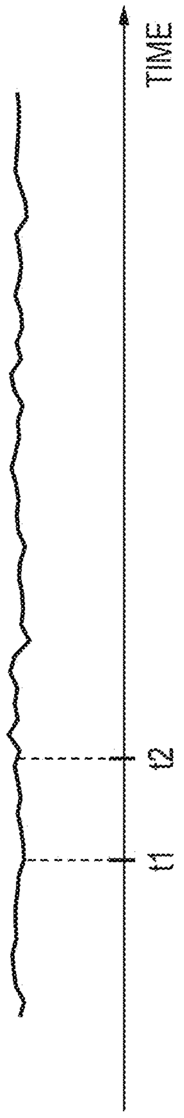
FIG. 4A is a view for explaining a method for acquiring fluctuation information.
Figure 4B:
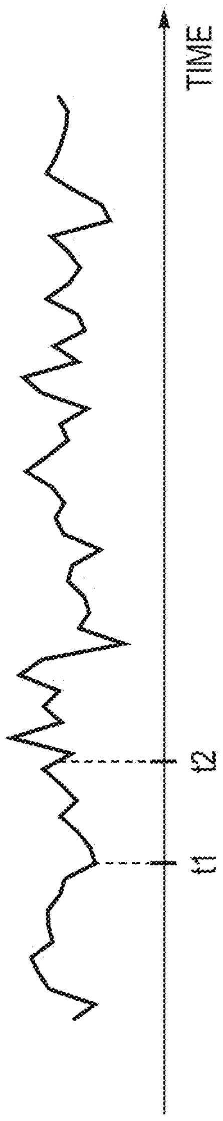
FIG. 4B is a view for explaining a method for acquiring fluctuation information.
Figure 4C:
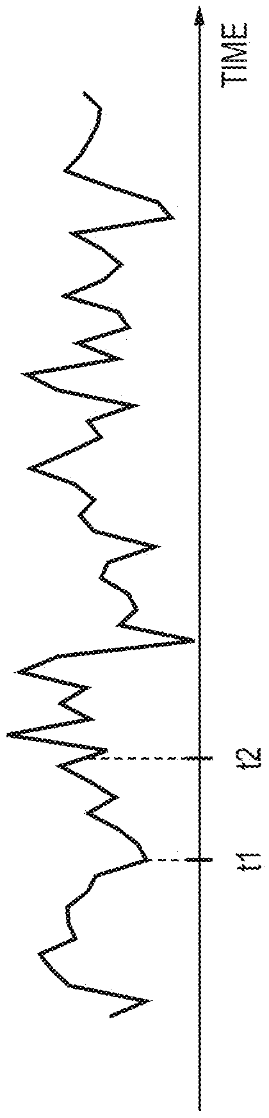
FIG. 4C is a view for explaining a method for acquiring fluctuation information.

A method of acquiring fluctuation information at each pixel position in an input image by the acquisition unit 111 will be described next with reference to FIGS. 4A to 4C. FIGS. 4A to 4C each show a pixel value at the same pixel position Q in the input image of each frame, in which the abscissa represents time (frame), and the ordinate represents the pixel value. The change (fluctuation amount) of the pixel value shown in FIG. 4B is larger than the change of the pixel value shown in FIG. 4A, and the change (fluctuation amount) of the pixel value shown in FIG. 4C is larger than the change of the pixel value shown in FIG. 4B.

Here, a frame corresponding to time t2 is defined as a current frame, and a frame corresponding to time t1 is defined as a past frame that is a frame preceding the current frame by one or more frames. At this time, the acquisition unit 111 calculates the difference between the pixel value at the pixel position Q in the input image of the frame corresponding to time t2 and the pixel value at the pixel position Q in the input image of the frame corresponding to time t1 as fluctuation information at the pixel position Q of the input image of the frame corresponding to time t2. As a method for obtaining the difference between one pixel value and the other pixel value (the pixel value difference between captured images), various methods can be used, and it is not limited to a specific method. For example, the acquisition unit 111 may calculate, as the difference between one pixel value and the other pixel value, the absolute value of the difference between the one pixel value and the other pixel value. Alternatively, the acquisition unit 111 may calculate, as the difference between one pixel value and the other pixel value, the square of the difference between the one pixel value and the other pixel value.

Thus, concerning each pixel position in the input image of the current frame, the acquisition unit 111 calculates, as the fluctuation information at the pixel position of the current frame, the difference between the pixel value at the pixel position in the input image and the pixel value at the pixel position in the past frame preceding the current frame (the past frame preceding the current frame by one or more frames).

An acquisition unit 112 acquires current focal length information from the imaging optical system 101. The focal length information is information about a focal length, for example, information about an angle of view. The acquisition unit 112 acquires, as the focal length information, information about the current position of the zoom lens from, for example, an encoder that detects the position of the zoom lens included in the imaging optical system 101. Note that if the image processing apparatus includes a function unit such as a teleconverter or digital zoom for changing the angle of view, or can communicate with the function unit, the current focal length information may be acquired from the function unit.

A decision unit 113 decides the correction strength of fluctuation correction to be performed for the input image. Details of the operation of the decision unit 113 will be described later.

A correction unit 114 performs fluctuation correction of the correction strength decided by the decision unit 113 for the input image, and outputs the input image that has undergone the fluctuation correction as an output image.

The output destination of the output image is not limited to a specific output destination. For example, the correction unit 114 may display the output image on a display unit (not shown) of the image processing apparatus, may store the output image in the memory (not shown) of the image processing apparatus, or may transmit the output image to an external apparatus via the network interface (not shown) of the image processing apparatus. An example of fluctuation correction by the correction unit 114 will be described with reference to FIGS. 5A to 5C.

Figure 5A:
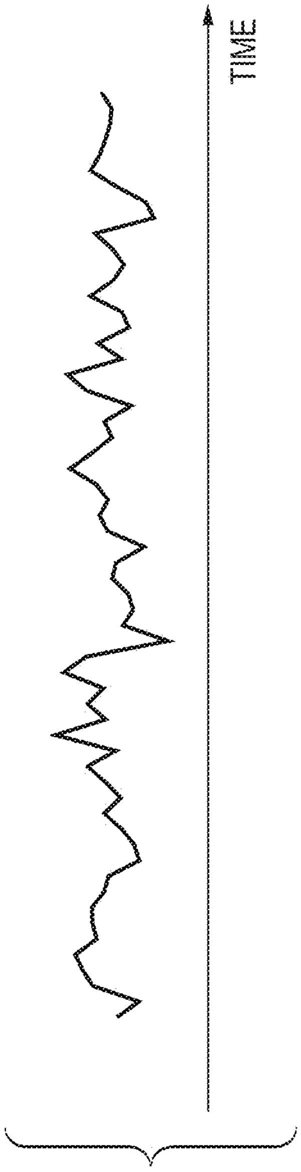
FIG. 5A is a view for explaining an example of fluctuation correction.

FIG. 5A shows a pixel value at the same pixel position P in the fluctuation captured image of each frame, in which the abscissa represents the frame (time), and the ordinate represents the pixel value. For the fluctuation correction, smoothing processing such as simple moving average processing or weighted moving average processing for smoothing the input images of a plurality of frames to generate the image of the current frame is used.

Figure 5B:
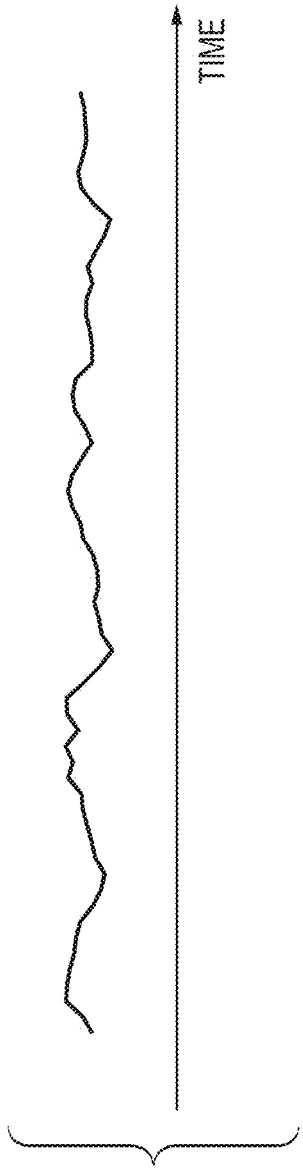
FIG. 5B is a view for explaining an example of fluctuation correction.
Figure 5C:
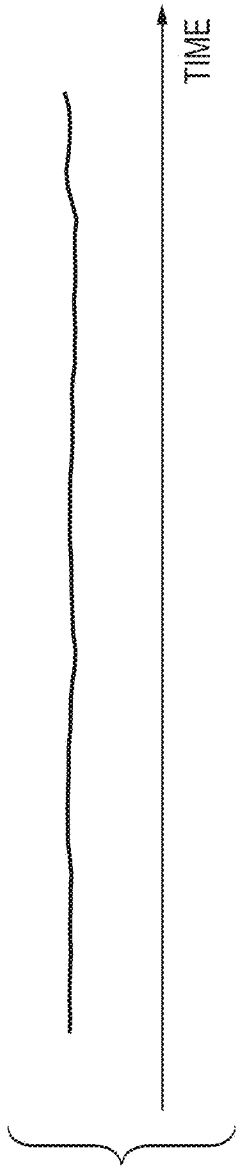
FIG. 5C is a view for explaining an example of fluctuation correction.

FIG. 5B shows the change of the pixel value at the pixel position P of an image obtained by performing smoothing processing that is fluctuation correction of a first correction strength for the input image (fluctuation captured image) shown in FIG. 5A. FIG. 5C shows the change of the pixel value at the pixel position P of an image obtained by performing smoothing processing that is fluctuation correction of a second correction strength (>first correction strength) for the input image (fluctuation captured image) shown in FIG. 5A. The change of the pixel value caused by the fluctuation is approximated to a normal distribution based on a predetermined position as a reference and can therefore be reduced by smoothing processing in the frame direction.

The correction unit 114 may change the number of frames to be used for smoothing processing in accordance with the correction strength. For example, the correction unit 114 increases the number of frames to be used for smoothing processing if the correction strength is high, and decreases the number of frames to be used for smoothing processing if the correction strength is low. The correction unit 114 performs smoothing processing using the input images of frames in the thus adjusted (changed) number, thereby generating the image of the current frame.

The correction unit 114 may change a weight to be used for smoothing processing in accordance with the correction strength. For example, the correction unit 114 increases the value of the weight if the correction strength is high, and decreases the value of the weight if the correction strength is low. The correction unit 114 performs smoothing processing using the thus adjusted (changed) weight value, thereby generating the image of the current frame.

Figure 6:
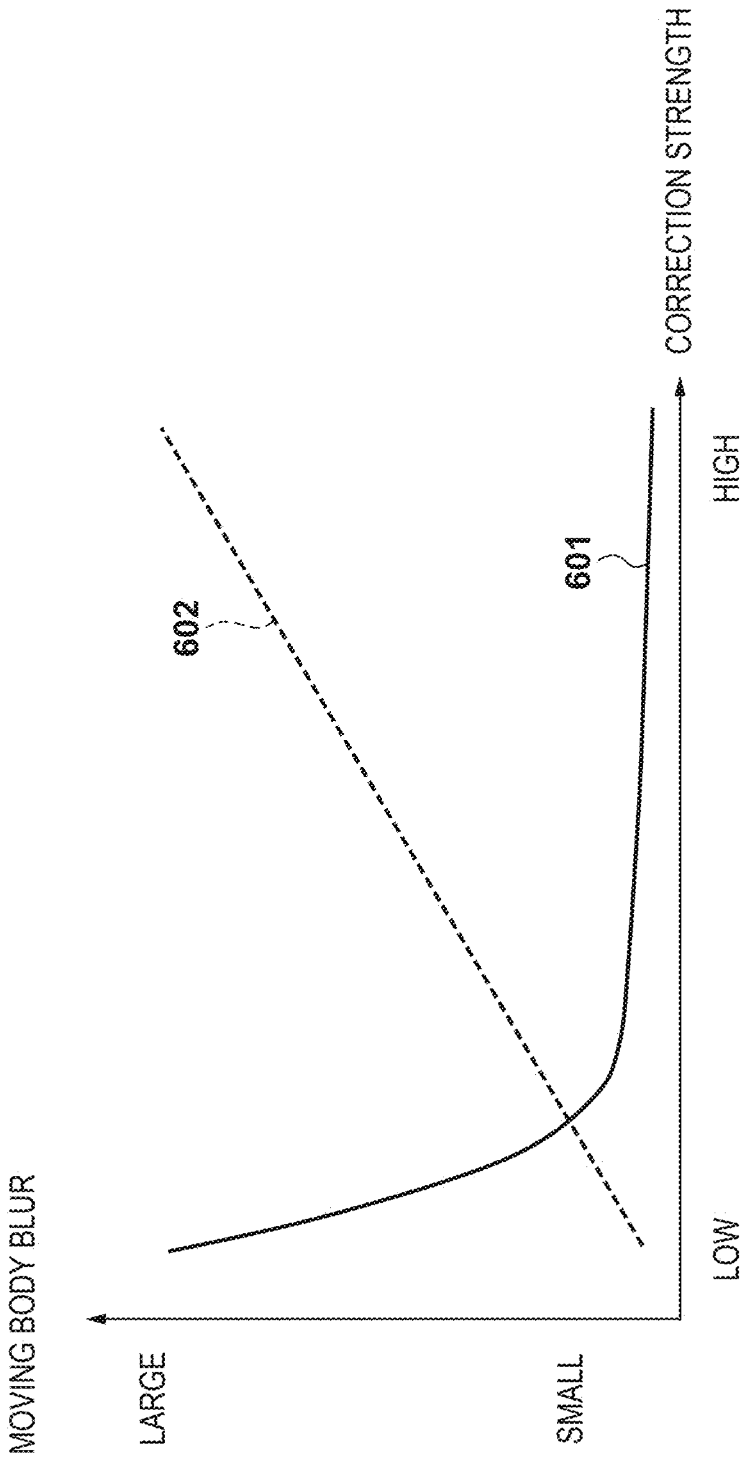
FIG. 6 is a view showing the relationship between a correction strength and a fluctuation.

As for which parameter in the smoothing processing is to be changed in accordance with the correction strength, it is not limited to a specific form. However, if the correction strength of smoothing processing in the frame direction is increased, the change of the pixel value in the frame direction is reduced, but a moving body blur may occur if a moving object is included in the input image. FIG. 6 shows the relationship between the correction strength and the fluctuation. A curve 601 indicates a change of the pixel value in the frame direction, and a line 602 indicates the degree of moving body blur. As shown in FIG. 6, when the correction strength is increased, a large fluctuation can be corrected. However, since the degree of moving body blur becomes high along with this, visibility may lower depending on the object.

Figure 7:
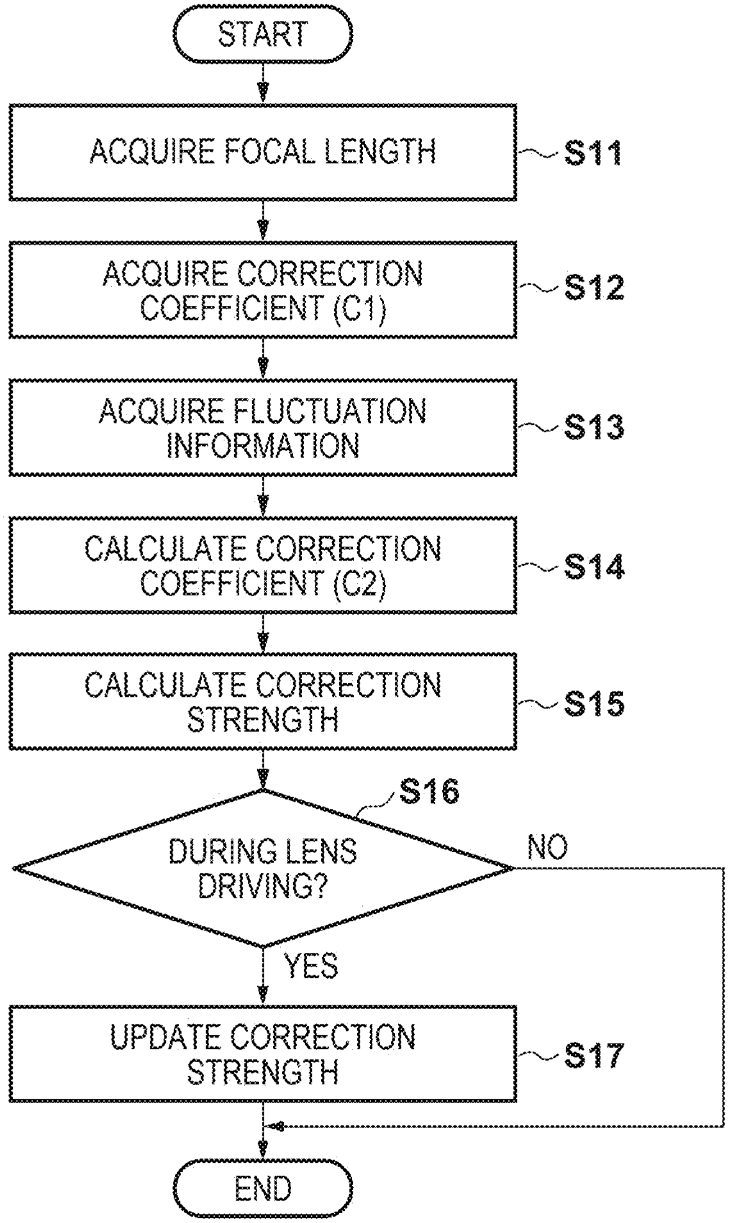
FIG. 7 is a flowchart showing the operation of a decision unit 113.

The operation of the decision unit 113 will be described next with reference to the flowchart of FIG. 7. In fluctuation correction performed by the correction unit 114, when the correction strength is increased, the fluctuation amount can be reduced, but the moving body blur becomes large. That is, if the correction strength of fluctuation correction is increased more than necessary, visibility may lower. Considering this, to suppress the moving body blur minimum while reducing the fluctuation amount, it is necessary to more accurately detect the fluctuation amount and decide the correction strength.

In step S11, the decision unit 113 acquires a focal length based on focal length information acquired by the acquisition unit 112. Since the focal length information is information about a focal point, a description of a method of acquiring focal length information based on such information will be omitted.

Figure 8:
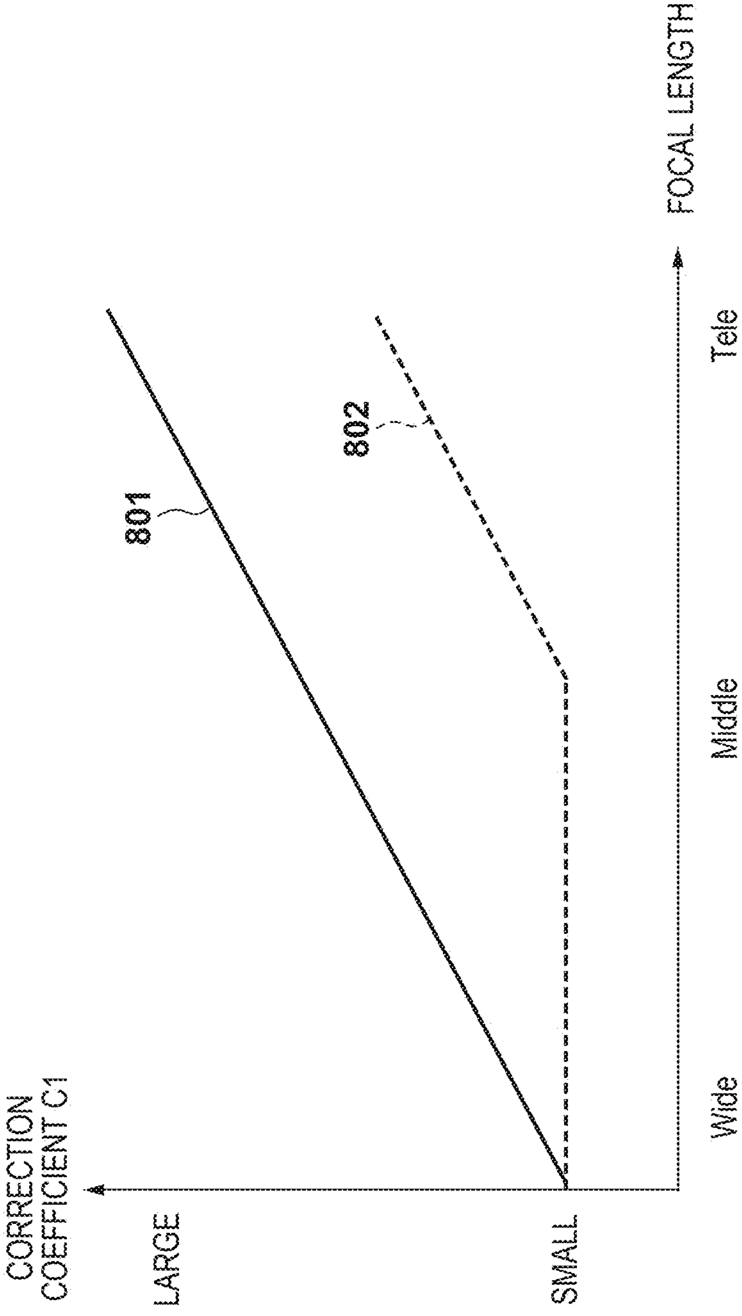
FIG. 8 is a view showing an LUT.

In step S12, the decision unit 113 acquires a correction coefficient C1 of fluctuation correction based on the focal length acquired in step S11. For example, the decision unit 113 acquires the correction coefficient C1 corresponding to the focal length acquired in step S11 from an LUT in which the correction coefficients C1 corresponding to various focal lengths are registered. The LUT will be described with reference to FIG. 8. In FIG. 8, the abscissa represents the focal length, and the ordinate represents the correction coefficient C1.

An LUT 801 is an example of an LUT in a case where priority is given to reduction of the fluctuation amount. In the LUT 801, the correction coefficient C1 having a smaller value is associated with a focal length closer to Wide, and the correction coefficient C1 having a larger value is associated with a focal length closer to Tele.

To explain an effect obtained by applying the LUT 801, factors that change the fluctuation amount will be described first. One of the factors that change the fluctuation amount is a change of the refractive index of atmosphere. The refractive index of atmosphere changes depending on a wavelength of light, a temperature, an atmospheric pressure, a humidity, a carbon dioxide concentration, and the like. Considering these, the longer the distance up to the object is, the larger the fluctuation amount becomes at high possibility. Next, the relationship between the focal length and the distance up to the object will be described. The focal length can change from Wide to Tele, and the angle of view of an image becomes wide when the focal length is set to Wide, and narrow when the focal length is set to Tele. When the angle of view is narrow, the number of pixels assigned to an object in the image increases. For this reason, if the distance up to the object is long, a focal length closer to Tele is often used. Also, since the number of pixels assigned to a fluctuation increases along with the increase in the number of pixels assigned to the object, the fluctuation amount increases as well. Thus, when the correction coefficient C1 that is in a directly proportional relationship with the focal length is used, the fluctuation amount can accurately be detected.

An LUT 802 is an example of an LUT in a case where priority is given to the balance between the fluctuation amount and the moving body blur. In the LUT 802, the correction coefficient C1 having a predetermined value is associated with a focal length within the range from Wide to Middle. Also, in the LUT 802, the correction coefficient C1 whose value is larger than the predetermined value is associated with a focal length within the range larger than Middle. Note that in the range larger than Middle, the correction coefficient C1 having a larger value is associated with a focal length closer to Tele.

In the above description, if the focal length falls within the range from Wide to Middle, the fluctuation amount is small and, therefore, priority is given to suppressing of the moving body blur by fluctuation correction. If the focal length is Tele, the fluctuation amount is large and, therefore, priority is given to reduction of the fluctuation. Thus, the correction coefficient C1 that gives priority to balance is used, as shown in the LUT 802, thereby accurately detecting the fluctuation amount while suppressing the moving body blur. When the correction coefficient C1 is acquired using the LUT, the fluctuation amount can accurately be detected.

A method for deciding the LUT to be looked up to acquire the correction coefficient C1 according to the focal length is not limited to a specific method. For example, the CPU 103 may list several items to place importance in fluctuation correction, display these on the display unit (a liquid crystal screen or a touch panel screen) (not shown) of the image processing apparatus, and cause a user to select one of the items. In this case, if the user operates an operation unit (a button, a switch, or a touch panel screen) (not shown) of the image processing apparatus and selects one of the items, the CPU 103 selects an LUT associated with the selected item as a selected LUT. In the example shown in FIG. 8, if the user selects an item "prefer to reduction of the fluctuation amount", the CPU 103 selects the LUT 801 as the selected LUT. If the user selects an item "prefer to the balance between the fluctuation amount and the moving body blur", the CPU 103 selects the LUT 802 as the selected LUT. The CPU 103 then acquires the correction coefficient C1 according to the focal length using the selected LUT.

In place of the LUT, a function representing the relationship between the focal length and the correction coefficient C1 may be used (in the example shown in FIG. 8, a function representing the line indicated by the LUT 801 or a piecewise linear function indicated by the LUT 802). In this case, the decision unit 113 may calculate, using the function, the correction coefficient C1 corresponding to the focal length acquired in step S11.

In step S13, the decision unit 113 acquires fluctuation information that the acquisition unit 111 has acquired for each pixel position in the input image.

In step S14, the decision unit 113 calculates a correction coefficient C2 of fluctuation correction based on the fluctuation information acquired in step S13. The decision unit 113, for example, acquires the dispersion of the fluctuation information acquired in step S13 and calculates, as the correction coefficient C2, a value obtained by normalizing the obtained dispersion within a predetermined range.

In step S15, the decision unit 113 calculates the correction strength of fluctuation correction. Various methods can be applied as the correction strength calculation method, and two methods (a first method and a second method) will be described below.

In the first method, the decision unit 113 calculates the correction strength based on the correction coefficient C1 acquired in step S12. That is, if the first method is employed, processing for calculating the correction coefficient C2 is unnecessary. The method for calculating the correction strength based on the correction coefficient C1 is not limited to a specific method, and the method need only calculate a lower correction strength as the value of the correction coefficient C1 becomes smaller, and a higher correction strength as the value of the correction coefficient C1 becomes larger. When the first method is used, a fluctuation can accurately be detected.

In the second method, the decision unit 113 calculates the correction strength based on the correction coefficient C1 acquired in step S12 and the correction coefficient C2 calculated in step S14. The method for calculating the correction strength based on the correction coefficient C1 and the correction coefficient C2 is not limited to a specific method, and the method need only calculate a lower correction strength as the value of the product of the correction coefficient C1 and the correction coefficient C2 becomes smaller, and a higher correction strength as the value of the product of the correction coefficient C1 and the correction coefficient C2 becomes larger.

With the correction coefficient C2, a change of a pixel value can be determined as a fluctuation amount. However, if a change of a pixel value that is not derived from a fluctuation is included in an image, it may erroneously be determined as a fluctuation amount. A change of a pixel value that is not derived from a fluctuation is a change of a pixel value caused by, for example, a moving object, shake of the apparatus, noise caused by the image capturing element, or the like. However, when the correction coefficient C1 that is not affected by these is used together, a fluctuation can be more accurately detected.

In step S16, the decision unit 113 acquires lens driving information indicating the driving state of a lens from the imaging optical system 101. The lens driving information is information indicating, for example, whether the zoom lens or the focus lens is being moved (driven) in the optical axis direction or whether the teleconverter (extender) is being driven.

If the lens driving information indicates that "the lens is being driven", the process advances to step S17. If the lens driving information indicates that "the lens is not being driven", the processing according to the flowchart of FIG. 7 is ended.

Note that the decision unit 113 may judge whether the focal length calculated based on the focal length information acquired by the acquisition unit 112 changes from the focal length calculated based on previously acquired focal length information. In this case, if it is judged that the focal length changes, the process advances to step S17. If it is judged that the focal length does not change, the processing according to the flowchart of FIG. 7 is ended.

In step S17, the decision unit 113 updates the correction strength calculated in step S15 to a lower correction strength. The updating amount used to update the correction strength to a lower correction strength is not limited to a specific updating amount.

Adverse effects in a case where fluctuation correction is applied during lens driving and a correction strength updating method for reducing these will be described here. If fluctuation correction is applied during lens driving, an adverse effect may occur due to a moving body blur. For example, since an image changes during lens driving, visibility may lower if a moving body blur occurs at this time. In addition, since the user may be executing adjustment of a lens position during lens driving, the position can hardly be adjusted if a moving body blur occurs at this time. Hence, to suppress the moving body blur during lens driving, the correction strength is updated to be lower. Note that when updating the correction strength, quality at the time of updating can be improved by gradually changing the strength.

Hence, the decision unit 113 decides the correction strength based on the focal length, thereby improving the fluctuation detection accuracy. Thus, according to this embodiment, the fluctuation detection accuracy is improved, thereby correcting a fluctuation with a desired correction strength independently of an object to be captured or the degree of fluctuation.

Note that, as described above, the image processing apparatus may not include the imaging optical system 101 or the image capturing element 102, and in this case, a computer apparatus such as a PC, a smartphone, or a tablet terminal device can be applied to the image processing apparatus.

Second Embodiment

Figure 9:
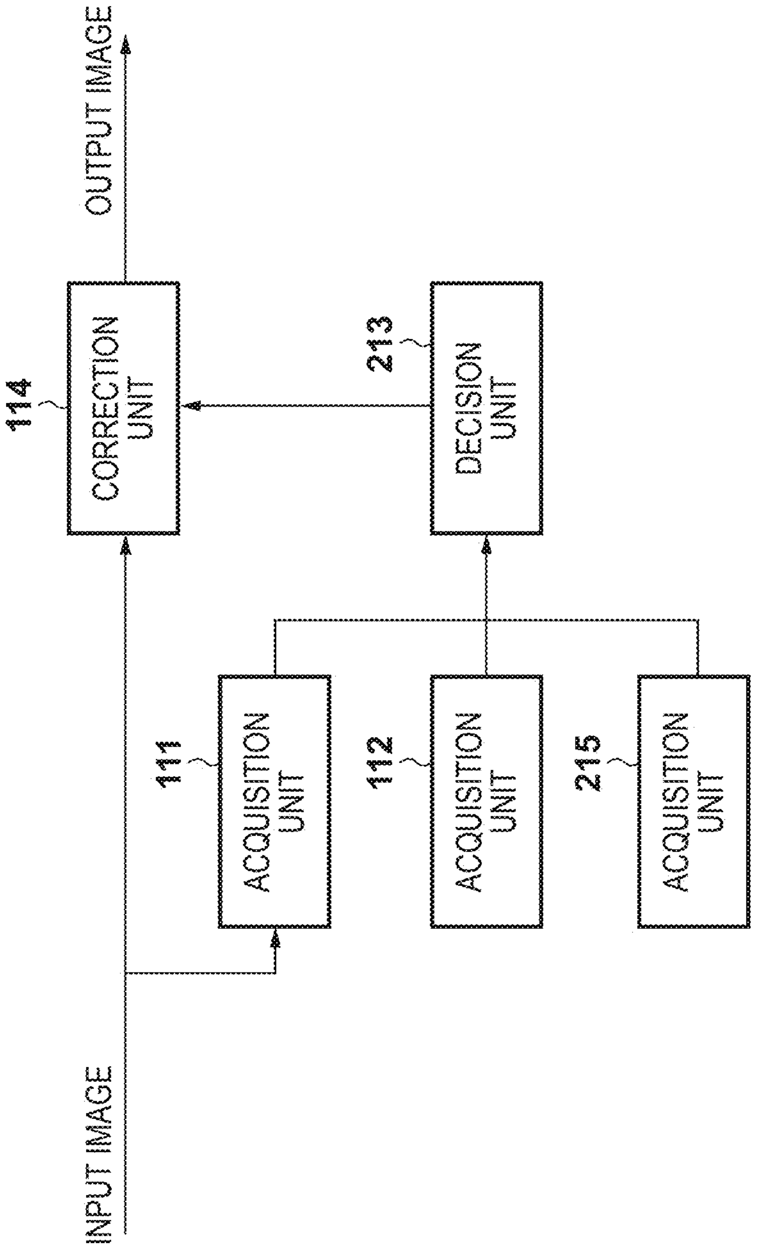
FIG. 9 is a block diagram showing an example of a functional configuration associated with processing of correcting a fluctuation in a captured image.

In this embodiment, differences from the first embodiment will be described, and the rest is the same as in the first embodiment unless it is specifically stated otherwise. An example of a functional configuration associated with processing of correcting a fluctuation in a captured image in an image processing apparatus according to this embodiment will be described with reference to the block diagram of FIG. 9. In this embodiment, a case where each function unit shown in FIG. 9 is implemented by software (computer program) will be explained. A function unit shown in FIG. 9 will sometimes be explained below as the main constituent of processing, but in fact, the function of the function unit is implemented by a CPU 103 executing a computer program corresponding to the function unit. Note that one or more function units shown in FIG. 9 may be implemented by hardware. The same reference numerals as in FIG. 2 denote the same function units in FIG. 9, and a description thereof will be omitted.

An acquisition unit 215 acquires current object distance information from an imaging optical system 101. The object distance information is information about the distance (object distance) from the imaging optical system 101 to an object and, for example, the acquisition unit 215 acquires the object distance information from "an encoder that detects the position of a focus lens", which is included in the lens driving unit of the imaging optical system 101. In this embodiment, the object distance information is information indicating the position of the focus lens in a case where it is focused on a principal object (to be referred to as a main object hereinafter).

Note that the method for acquiring the object distance information is not limited to a specific method. For example, if the image processing apparatus includes a light source and a sensor, the acquisition unit 215 may acquire the object distance information using the time of flight (TOF) method for calculating the object distance based on time needed for light from the light source to be reflected by a target and returned to the sensor and the speed of light.

Figure 10:
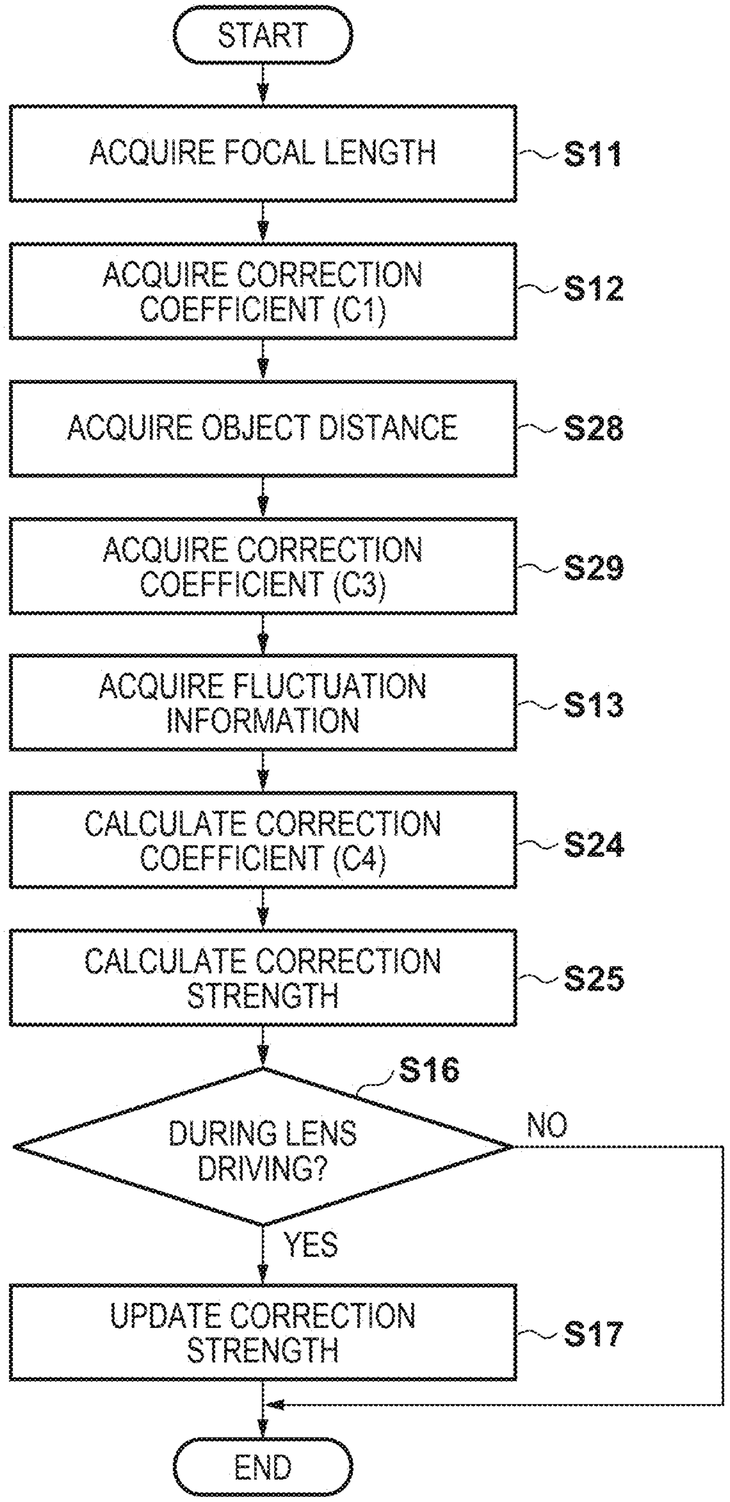
FIG. 10 is a flowchart showing the operation of a decision unit 213.

A decision unit 213 decides the correction strength of fluctuation correction. The operation of the decision unit 213 will be described with reference to the flowchart of FIG. 10. The same step numbers as in FIG. 7 denote the same processing steps in the flowchart of FIG. 10, and a description thereof will be omitted.

In step S28, the decision unit 213 acquires the object distance based on the object distance information acquired by the acquisition unit 215. Since the object distance information is information about the object distance, a description of a method for acquiring the object distance based on such information will be omitted.

Figure 11:
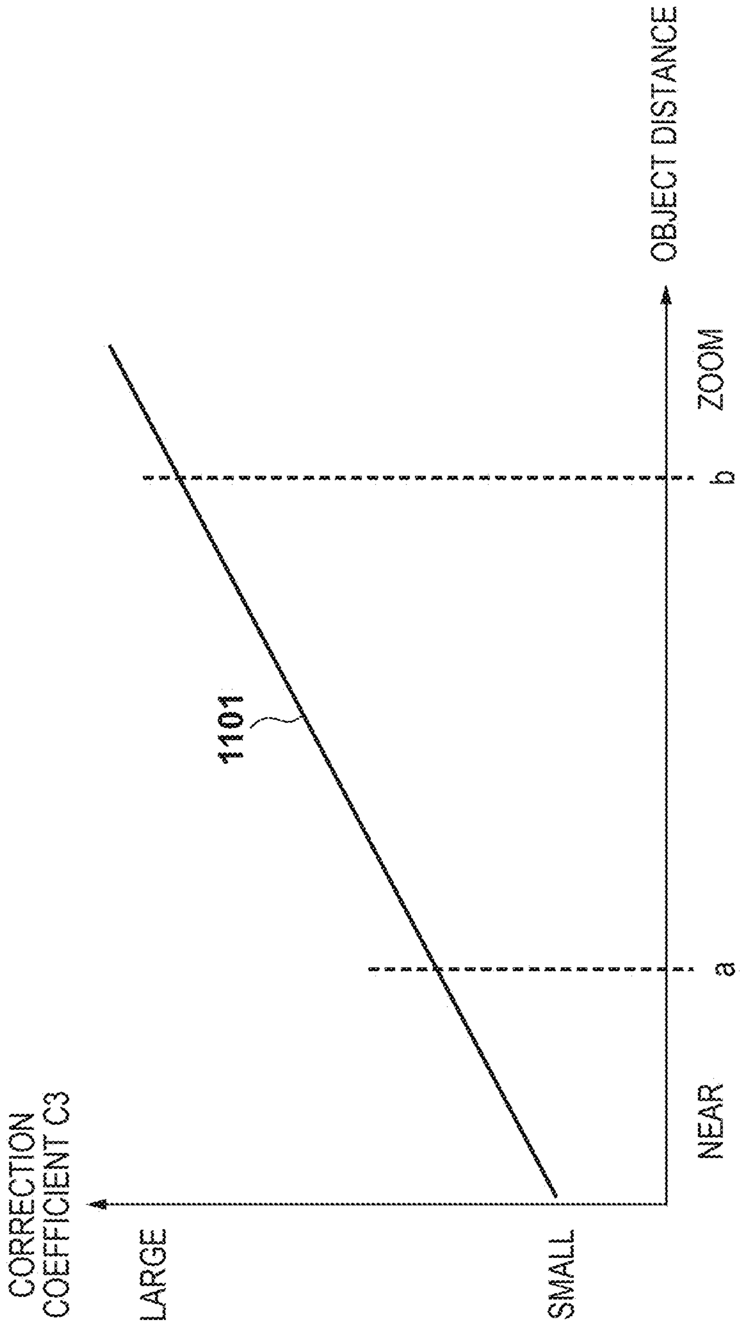
FIG. 11 is a view showing an LUT.

In step S29, the decision unit 213 calculates a correction coefficient C3 of fluctuation correction based on the object distance acquired in step S28. For example, the decision unit 213 acquires the correction coefficient C3 corresponding to the object distance acquired in step S28 from an LUT in which the correction coefficients C3 corresponding to various object distances are registered. The LUT will be described with reference to FIG. 11. In FIG. 11, the abscissa represents the object distance, and the ordinate represents the correction coefficient C3.

In an LUT 1101, the correction coefficient C3 having a smaller value is associated with an object distance closer to "near", and the correction coefficient C3 having a larger value is associated with an object distance closer to "far".

Figure 12:
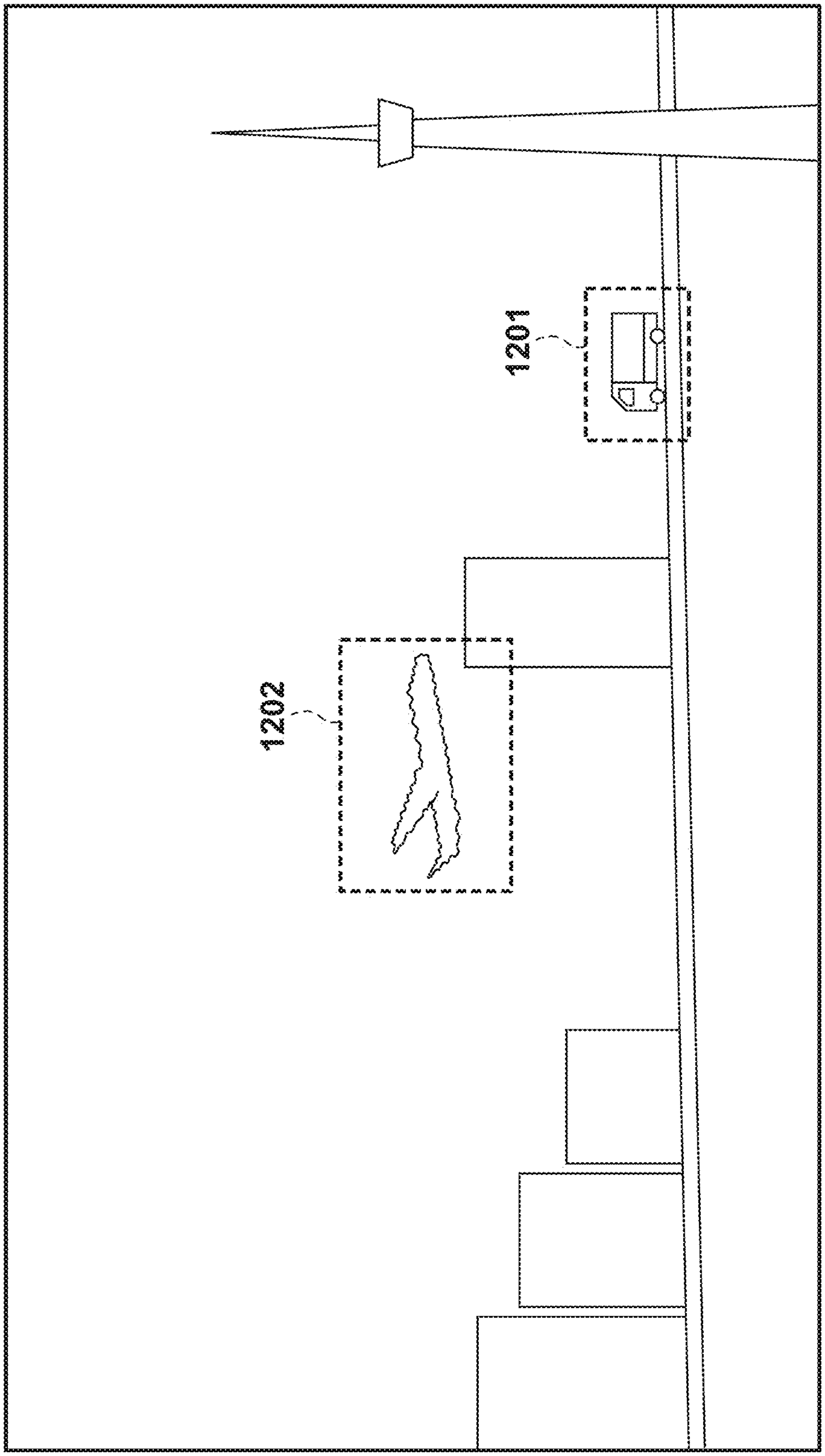
FIG. 12 is a view showing an example of a captured image including objects with different object distances.

FIG. 12 shows an example of a captured image including objects of different object distances. An object surrounded by a rectangle 1201 is an object on the near side (near object), and an object surrounded by a rectangle 1202 is an object on the far side (far object).

In FIG. 11, a is the object distance of the near object, and b is the object distance of the far object. If the object distance acquired based on the object distance information acquired by the acquisition unit 215 is the object distance a, the correction coefficient C3 corresponding to the object distance a in the LUT 1101 is obtained. If the object distance acquired based on the object distance information acquired by the acquisition unit 215 is the object distance b, the correction coefficient C3 corresponding to the object distance b (>the correction coefficient C3 corresponding to the object distance a) in the LUT 1101 is obtained.

Note that as for the relationship between the object distance and the fluctuation amount, as described above, there is a tendency that the shorter the object distance is, the smaller the fluctuation amount is, and the longer the object distance is, the larger the fluctuation amount is. For this reason, based on this relationship, when the correction coefficient C3 that is in a proportional relationship with the object distance is used, the fluctuation amount can accurately be detected.

In step S24, the decision unit 213 acquires a correction coefficient C4 of fluctuation correction based on fluctuation information acquired in step S13 and the object distance information acquired in step S28. An example of a method of acquiring the correction coefficient C4 will be described here.

First, the decision unit 213 acquires the in-focus range of the object from the object distance information. For example, in the example shown in FIG. 12, the in-focus range is the range of the rectangle 1201 if the lens is focused on the near object, and the range of the rectangle 1202 if the lens is focused on the far object.

Next, the decision unit 213 acquires fluctuation information at each pixel position in the in-focus range, and calculates the correction coefficient C4 of fluctuation correction based on the acquired fluctuation information. The decision unit 213, for example, acquires fluctuation information at each pixel position in the in-focus range, acquires the dispersion of the acquired fluctuation information, and calculates, as the correction coefficient C4, a value obtained by normalizing the obtained dispersion within a predetermined range.

In step S25, the decision unit 213 calculates the correction strength of fluctuation correction. Various methods can be applied as the correction strength calculation method, and two methods (a first method and a second method) will be described below.

In the first method, the decision unit 213 calculates the correction strength based on the correction coefficient C3. That is, if the first method is employed, processing for acquiring a correction coefficient C1 and processing for acquiring the correction coefficient C4 are unnecessary. The method for calculating the correction strength based on the correction coefficient C3 is not limited to a specific method, and the method need only calculate a lower correction strength as the value of the correction coefficient C3 becomes smaller, and a higher correction strength as the value of the correction coefficient C3 becomes larger. When the first method is used, a fluctuation can accurately be detected. Furthermore, since the correction coefficient C3 is calculated based on the object distance of the main object, the fluctuation amount of the main object can be calculated. As described above, according to the first method, it is possible to accurately calculate the fluctuation correction strength by using the correction coefficient C3.

In the second method, the decision unit 213 calculates the correction strength based on the correction coefficient C1, the correction coefficient C3, and the correction coefficient C4. The method for calculating the correction strength based on the correction coefficient C1, the correction coefficient C3, and the correction coefficient C4 is not limited to a specific method, and the method need only calculate a lower correction strength as the value of the product of the correction coefficient C1, the correction coefficient C3, and the correction coefficient C4 becomes smaller, and a higher correction strength as the value of the product of the correction coefficient C1, the correction coefficient C3, and the correction coefficient C4 becomes larger.

By using the correction coefficient C4, the fluctuation amount is calculated from the range of the main object, as compared to the correction coefficient C2, and in this point, an effect of reducing determination errors caused by a change of a pixel value which is not derived from a fluctuation can be obtained. Furthermore, when the correction coefficient C1 and the correction coefficient C3 are used together, a fluctuation can be more accurately determined. Hence, the decision unit 213 decides the correction strength based on the object distance, thereby improving the fluctuation detection accuracy.

Thus, according to this embodiment, the fluctuation detection accuracy is improved, thereby correcting a fluctuation with a desired correction strength independently of an object to be captured or the degree of fluctuation.

Numerical values, processing timings, processing orders, main constituents of processing, data (information) configurations/acquisition methods/transmission destinations/transmission sources/storage locations, and the like used in the above-described embodiments are mere examples used to make a detailed description, and are not intended to be limited to the examples.

Some or all of the above-described embodiments may appropriately be used in combination. In addition, some or all of the above-described embodiments may selectively be used.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2024-026910, filed Feb. 26, 2024, which is hereby incorporated by reference herein in its entirety.

What is claimed is:

1. An image processing apparatus comprising:

one or more memories storing instructions and one or more processors that execute the instructions to:

(1) acquire information about a focal length as distance information; and (2) correct a fluctuation in a captured image, the fluctuation being caused by an uneven change in a refractive index of atmosphere, based on the distance information, wherein a first correction coefficient corresponding to a focal length obtained based on the distance information is acquired, wherein a second correction coefficient is acquired based on a fluctuation amount in the captured image, and wherein the correction is performed with a correction strength based on the first correction coefficient and the second correction coefficient.

2. The apparatus according to claim 1, wherein the fluctuation amount at each pixel position is acquired based on a difference of a pixel value between captured images, and wherein a value obtained by normalizing a dispersion of the fluctuation amount is acquired as the second correction coefficient.

3. The apparatus according to claim 1, wherein the smaller a value of a product of the first correction coefficient and the second correction coefficient is, the lower the correction strength is, and the larger the value is, the higher the correction strength is.

4. An image processing apparatus comprising:

one or more memories storing instructions and one or more processors that execute the instructions to:

(1) acquire information about a distance to an object as distance information; and (2) correct a fluctuation in a captured image, the fluctuation being caused by an uneven change in a refractive index of atmosphere, based on the distance information, wherein a first correction coefficient corresponding to an object distance obtained based on the distance information is acquired, wherein a second correction coefficient corresponding to a focal length is acquired, wherein a third correction coefficient is acquired based on a fluctuation amount in the captured image and the distance information, and wherein the correction is performed with a correction strength based on the first correction coefficient, the second correction coefficient, and the third correction coefficient.

5. The apparatus according to claim 4, wherein the third correction coefficient is acquired based on the fluctuation amount in an in-focus range obtained based on the distance information in the captured image.

6. The apparatus according to claim 4, wherein the smaller a value of a product of the first correction coefficient, the second correction coefficient, and the third correction coefficient is, the lower the correction strength is, and the larger the value is, the higher the correction strength is.

7. The apparatus according to claim 1, wherein during driving of a lens, the correction strength is updated to be lower.

8. The apparatus according to claim 1, further comprising an image capturing unit.

9. An image processing method performed by an image processing apparatus, the method comprising:

acquiring information about a focal length as distance information; and correcting a fluctuation in a captured image, the fluctuation being caused by an uneven change in a refractive index of atmosphere, based on the distance information, wherein a first correction coefficient corresponding to a focal length obtained based on the distance information is acquired, wherein a second correction coefficient is acquired based on a fluctuation amount in the captured image, and wherein the correction is performed with a correction strength based on the first correction coefficient and the second correction coefficient.

10. An image processing method performed by an image processing apparatus, the method comprising:

acquiring information about a distance to an object as distance information; and correcting a fluctuation in a captured image, the fluctuation being caused by an uneven change in a refractive index of atmosphere, based on the distance information, wherein a first correction coefficient corresponding to an object distance obtained based on the distance information is acquired, wherein a second correction coefficient corresponding to a focal length is acquired, wherein a third correction coefficient is acquired based on a fluctuation amount in the captured image and the distance information, and wherein the correction is performed with a correction strength based on the first correction coefficient, the second correction coefficient, and the third correction coefficient.

11. A non-transitory computer-readable storage medium storing a computer program for causing a computer to:

acquire information about a focal length as distance information; and correct a fluctuation in a captured image, the fluctuation being caused by an uneven change in a refractive index of atmosphere, based on the distance information, wherein a first correction coefficient corresponding to a focal length obtained based on the distance information is acquired, wherein a second correction coefficient is acquired based on a fluctuation amount in the captured image, and wherein the correction is performed with a correction strength based on the first correction coefficient and the second correction coefficient.

12. A non-transitory computer-readable storage medium storing a computer program for causing a computer to:

acquire information about a distance to an object as distance information; and correct a fluctuation in a captured image, the fluctuation being caused by an uneven change in a refractive index of atmosphere, based on the distance information, wherein a first correction coefficient corresponding to an object distance obtained based on the distance information is acquired, wherein a second correction coefficient corresponding to a focal length is acquired, wherein a third correction coefficient is acquired based on a fluctuation amount in the captured image and the distance information, and wherein the correction is performed with a correction strength based on the first correction coefficient, the second correction coefficient, and the third correction coefficient.

* * * * *